J. H. WICKSTROM.
AUTOMATIC VACUUM HOG WATERING TROUGH.
APPLICATION FILED DEC. 22, 1919.

1,359,852.

Patented Nov. 23, 1920.
2 SHEETS—SHEET 1.

Inventor
J. H. Wickstrom,
By Frank L. N. Hough
Attorneys

J. H. WICKSTROM.
AUTOMATIC VACUUM HOG WATERING TROUGH.
APPLICATION FILED DEC. 22, 1919.
1,359,852.
Patented Nov. 23, 1920.
2 SHEETS—SHEET 2.
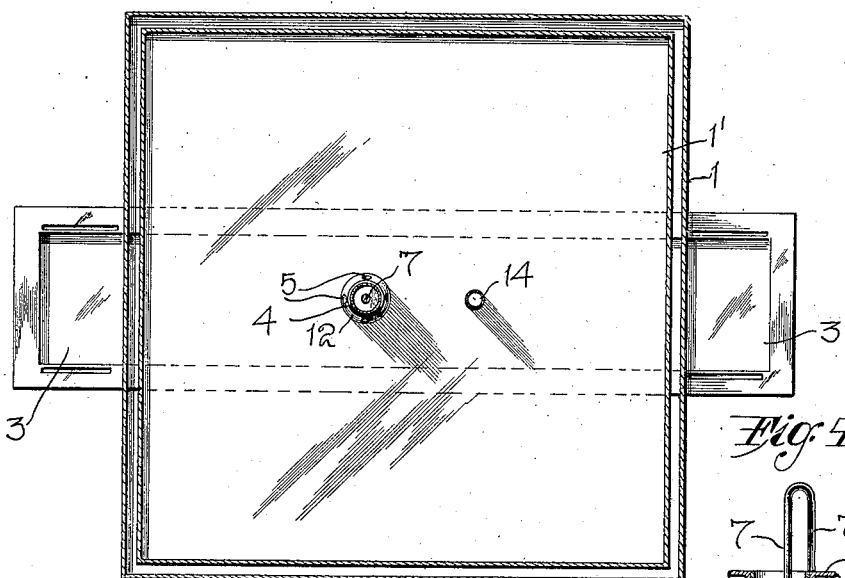
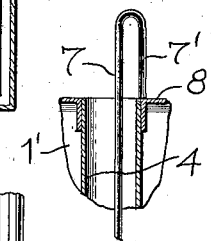
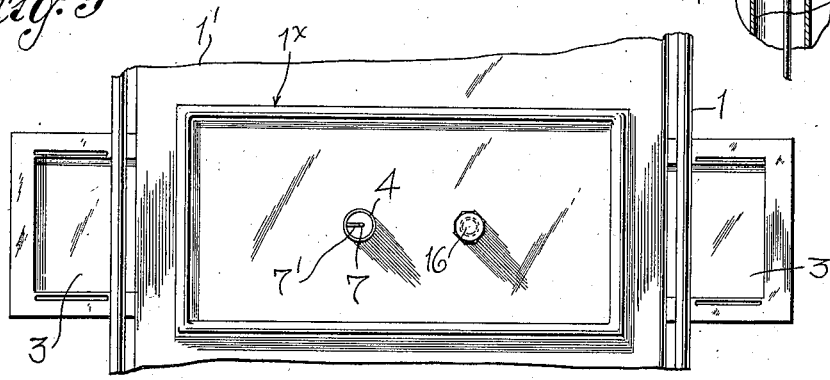
Inventor
J. H. Wickstrom
By Franklin N. Hough
Attorneys

UNITED STATES PATENT OFFICE.

JOSEPH H. WICKSTROM, OF BERESFORD, SOUTH DAKOTA.

AUTOMATIC VACUUM HOG-WATERING TROUGH.

1,359,852.   Specification of Letters Patent.   Patented Nov. 23, 1920.

Application filed December 22, 1919. Serial No. 346,532.

*To all whom it may concern:*

Be it known that I, JOSEPH H. WICKSTROM, a citizen of the United States, residing at Beresford in the county of Union and State of South Dakota, have invented certain new and useful Improvements in Automatic Vacuum Hog-Watering Troughs; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in automatic vacuum water container for hog fountains, and comprises a simple and efficient device of this nature having various details of construction, combination and arrangement of parts which will be hereinafter fully described, shown in the accompanying drawings and then specifically defined in the appended claim.

My invention is illustrated in the accompanying drawings which, with the numerals of reference marked thereon, form a part of this application, and in which:

Fig. 2 is a cross sectional view on line 2—2 of Fig. 1.

Fig. 3 is a top plan view with the cover removed, and

Fig. 4 is an enlarged detail sectional view through the filling pipe and valve rod.

Figure 1:
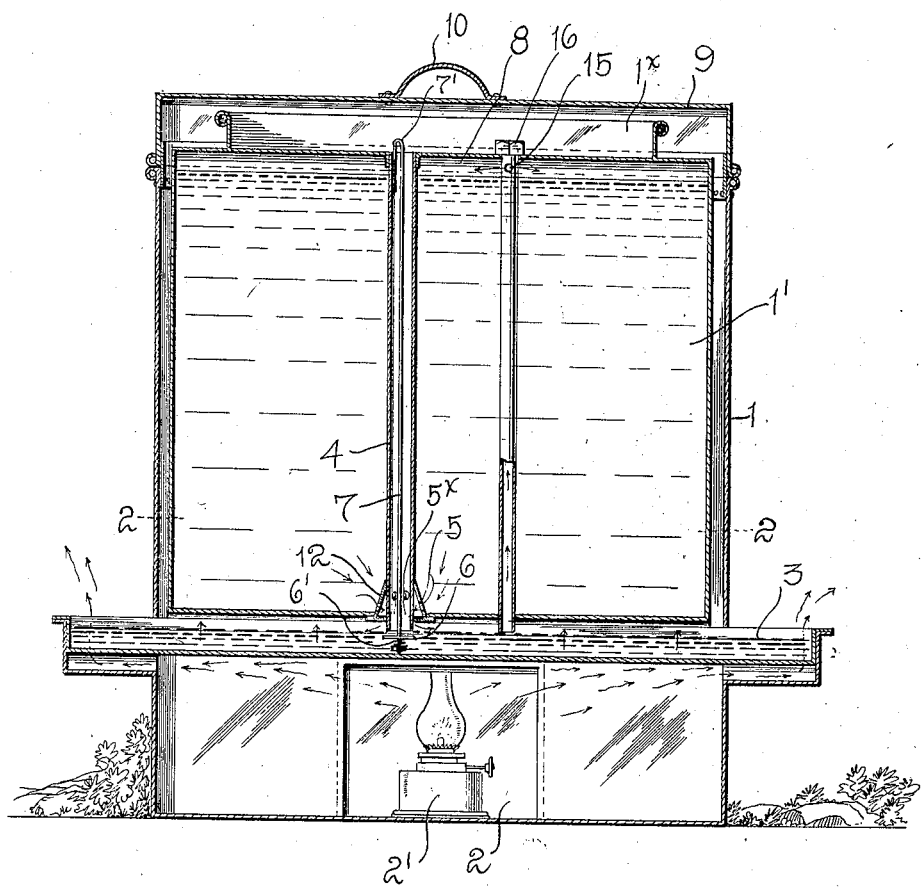
Figure 1 is a central sectional view through the invention.

Reference now being had to the details of the drawings by numerals:

1 designates the outer casing of the apparatus, and 1' a vacuum water tank with a space intervening between the wall of the same and the wall of the casing. Said casing is provided with a cover 9 having a suitable handle 10. Upon the top of the vacuum water tank is a tray $1^x$ in which water is poured when filling the tank beneath. A pipe 4 extends through the top and bottom of the tank, the lower end of the pipe projecting preferably a slight distance below the tank and into the watering trough beneath. A suitable heat compartment 2 is positioned underneath the trough and in which a lamp 2' is positioned, the heat generated from the lamp taking the direction indicated by arrows about the tray to prevent the same from freezing in cold weather.

A spring pressed valve 6 is fastened to the lower end of the rod 7, the latter passing up through the tube 4 and having its upper end 7' turned to form a hook which is adapted to engage over the top of the tank in the manner shown in Fig. 4 of the drawings when it is desired to hold the valve closed, as will be occasioned while the tank is being filled. When the rod 7 is moved upward to engage the hook 7' with the top of the tank 1, as shown in Fig. 4, the valve 6 contacts with the end of the pipe 4 and compresses the spring 6'. When the hook is removed from the top of the tank, and assumes the position shown in Fig. 1 of the drawings, the valve will be moved to an open position.

A conical shaped hood 12 is placed about the lower portion of the tube 4 and has apertures 5 therein through which water is adapted to pass into or out of the tank, and other apertures $5^x$ are formed in the wall of the tube 4 adjacent to its lower end above the apertures 5, and which communicate between the tube and the space between the latter and said hood.

A vent tube 14 passes through the top and bottom walls of the tank, the lower end of the vent tube extending into the trough a slight distance, which will determine the level of the surface of the water in the trough. The upper end of the tube has a nut 16 thereon, and apertures 15 are formed in the tube near its upper end and below the top of the tank.

In operation, when it is desired to fill the tank, the rod 7 is raised and the hooked or bent end 7' caught over the top of the tank in the manner shown in Fig. 4 of the drawings, which will hold the valve 6 seated to prevent the escape of water through the lower end of the tube 4 when the tank is filled by pouring water through the tray $1^x$ and which will run down through the tube 4, the apertures 5 and $5^x$ into the tank. When the rod is unhooked and lowered a short distance said valve is unseated and permits water to flow through the apertures 5 and $5^x$ into the tube and out the lower end of the tube into the trough. The water will rise in the trough until the upper surface thereof closes the lower end of the vent tube 14 which will stop the flow of water through tube 4. As the water is used, the surface thereof will lower and permit the water to be replenished, the supply being automatically regulated by opening and closing the lower end of the vent tube, as will be readily understood.

What I claim to be new is:

An automatic vacuum drum watering trough comprising a tank, a trough below the same, an open-ended pipe projecting through the top and bottom of the tank and apertured at a point near and above the bottom of said tank, an apertured hood inclosing said apertured portion of the pipe, a rod extending through the pipe, a valve carried by said rod toward its lower end and provided with a coiled spring interposed between the bottom of said valve and the lower end of said rod, said valve being adapted to close passage through the bottom of said tank when the rod is raised, and a vent tube extending through the bottom of said tank into said trough, and apertured toward its top so as to communicate with the tank near the top thereof.

In testimony whereof I hereunto affix my signature.

JOSEPH H. WICKSTROM.